United States Patent [19]

Mayne et al.

[11] 4,160,233
[45] * Jul. 3, 1979

[54] SEISMIC ARRAY

[75] Inventors: William H. Mayne; William S. Hawes; Algernon S. Badger, all of Houston, Tex.

[73] Assignee: Geosource Inc., Houston, Tex.

[*] Notice: The portion of the term of this patent subsequent to May 17, 1994, has been disclaimed.

[21] Appl. No.: 825,117

[22] Filed: Aug. 16, 1977

Related U.S. Application Data

[63] Continuation of Ser. No. 727,019, Sep. 27, 1976, abandoned.

[51] Int. Cl.² ............................................. G01V 1/20
[52] U.S. Cl. ..................... 340/15.5 MC; 340/15.5 TS; 340/182
[58] Field of Search ................ 340/15.5 MC, 15.5 TS, 340/15.5 F, 15.5 GC, 179, 182, 211; 328/104, 156

[56] References Cited

U.S. PATENT DOCUMENTS

| | | | |
|---|---|---|---|
| 2,266,040 | 12/1941 | Hoover, Jr. | 340/15.5 MC |
| 2,698,927 | 1/1955 | Parr, Jr. | 340/15.5 CP |
| 2,747,172 | 5/1956 | Bayhi | 340/15.5 MC |
| 3,286,228 | 11/1966 | Anstey | 340/15.5 MC |
| 3,863,200 | 1/1975 | Miller | 340/17 R |
| 3,863,201 | 1/1975 | Briggs et al. | 340/15.5 MC |
| 3,887,897 | 6/1975 | Neitzel et al. | 340/15.5 TS |

*Primary Examiner*—Howard A. Birmiel
*Attorney, Agent, or Firm*—Arnold, White & Durkee

[57] ABSTRACT

An improved seismic array is disclosed having a plurality of seismic detector connection points with a seismic detector at each seismic detector connection point. The output of each seismic detector in the array is weighted by providing first resistive weighting at each seismic detector connection point. The weighted output of all detectors in the array is provided to a first end of the array over a single pair of wires. An amplifier is additionally provided for connection to the pair of wires at the first end of the array, and the amplifier has feedback network, including a resistor. The ratio of the value of the resistance in the feedback network to the value of the weighting resistor at a seismic detector connection point determines the magnitude of the signal appearing at the output of the amplifier from the response from the seismic detector at that point. An array having bi-directional capabilities is achieved by providing second resistive weighting to the output of each seismic detector in the array and by providing a second pair of wires which interconnects this second weighted output of the detectors and which emerges from the second end of the array. A second amplifier is coupled to the pair of wires at the second end of the array, and this amplifier also has a feedback network including a resistor. The ratio of the value of the feedback resistor to the value of the second resistive weight at each seismic detector connection point determines the magnitude of the signal appearing at the output of the second amplifier from the response of the seismic detector at the seismic detector connection point. Chebychev weighting of the array response may be achieved by proper choice of the values of the feedback resistors and the weighting resistors at each seismic detector connection point.

20 Claims, 10 Drawing Figures

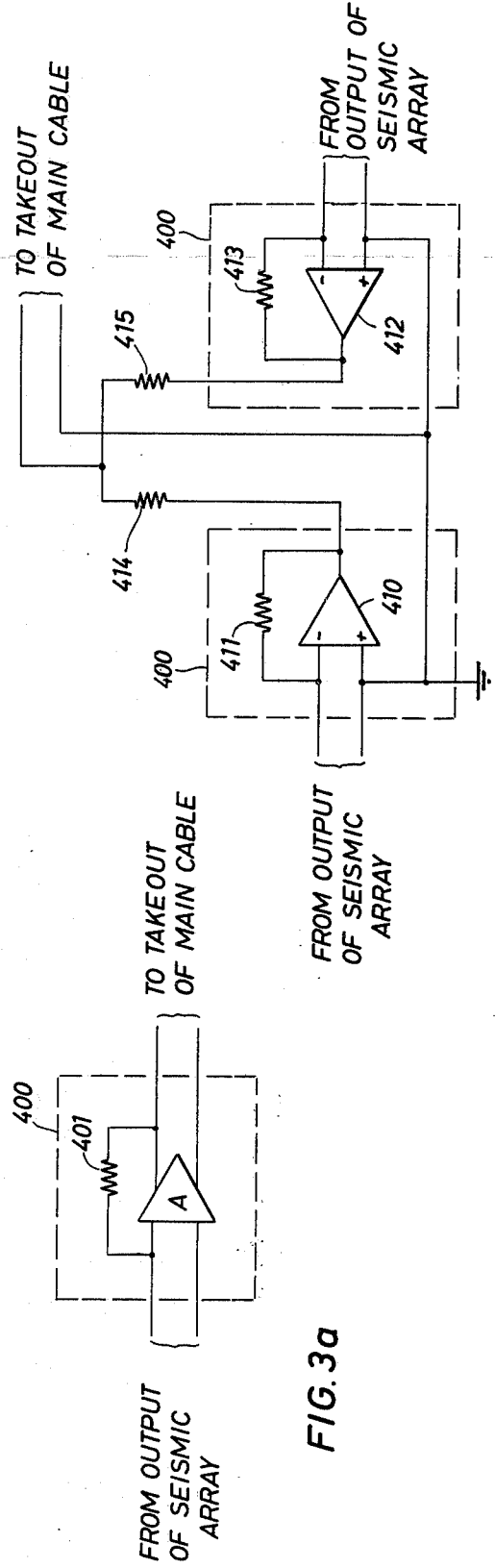
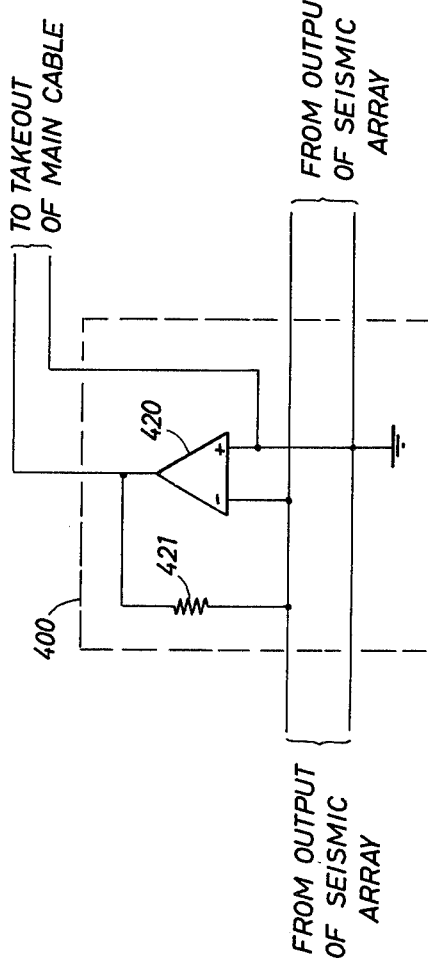
FIG. 3a
FIG. 3b
FIG. 3c

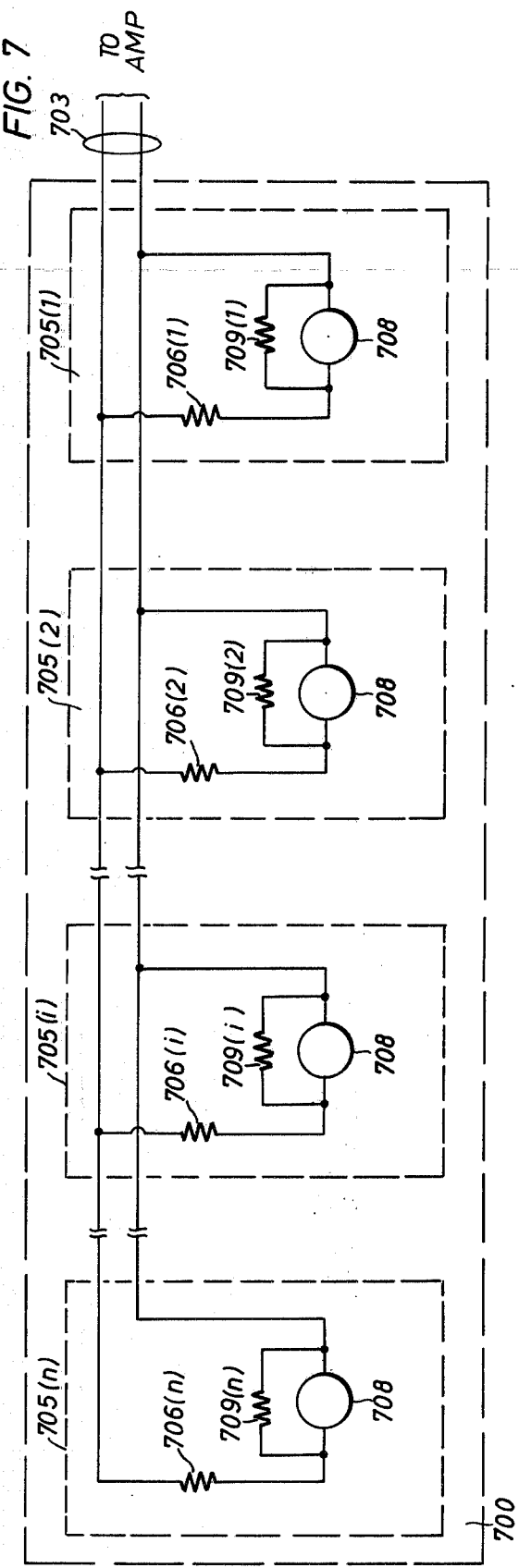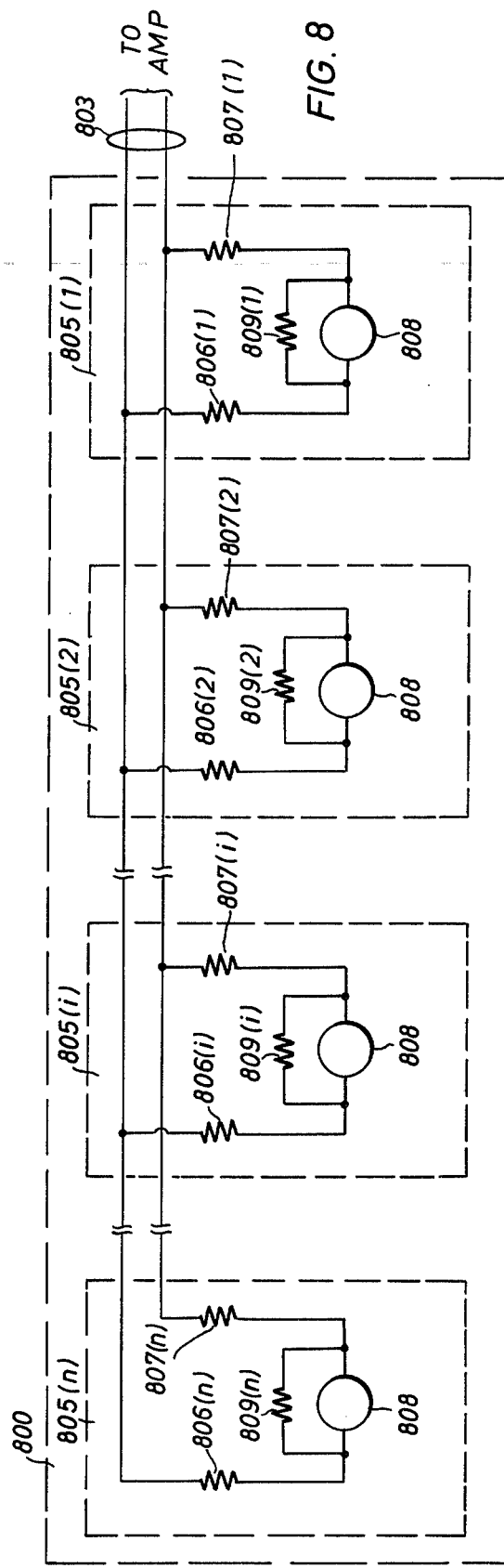

SEISMIC ARRAY

This application is a continuation of U.S. Patent application Ser. No. 727,019, filed Sept. 27, 1976, now abandoned, which was a continuation-in-part of U.S. Pat. application Ser. No. 656,528, filed Feb. 9, 1976, now U.S. Pat. No. 4,024,492.

BACKGROUND OF THE INVENTION

1. Field of the Invention

This invention relates to improved seismic array for seismic prospecting.

2. Description of the Prior Art

In seismic exploration, seismic waves are commonly used to probe the earth's crust as a means of determining the type and location of subsurface formations. The earth's crust can be considered a transmission medium or filter whose characteristics are to be determined by passing seismic waves through that medium. In the reflection seismic method seismic waves or impulses are generated at a point at or near the earth's surface, and the compressional mode of these waves is reflected from subsurface acoustic impedance boundaries and detected by arrays of seismic detectors located at the surface. The seismic detectors convert the received waves into electrical signals which are sensed and recorded in a form which permits analysis. Skilled interpreters can discern from such an analysis the shape and depth of subsurface reflection boundaries and the likelihood of finding an accumulation of minerals, such as oil and gas.

It is well known to those skilled in the art that the complex of vibrations received at a given seismic detector array do not consist totally of waves reflected from subsurface boundaries. Rather, the array also detects unwanted random seismic events as well as various high amplitude modes of spatially-coherent source-generated seismic events whose principal direction of propagation is horizontal, i.e., along and near the free surface. It is essential that the effects of these unwanted horizontally-propagated waves be reduced by utilizing the principles of a directional antenna to attenuate the magnitude of the electrical signal produced by the geophones in response to these waves.

In U.S. Pat. No. 3,698,927 to Parr, there is disclosed a method of reducing the effects of the coherent horizontally-propagated seismic waves. This method comprises assigning relative sensitivity values to geophones in a stringer. The sensitivity values are selected according to recognized antenna theory so as to reduce the magnitude of the electrical signal produced in response to the unwanted spatially coherent seismic waves. Parr refers to his method as a "tapered sensitivity" method, since the sensitivity of the sensing devices in a given array is reduced toward either end of the array from a central point when the transducers are aligned radial to the energy sources used to generate the seismic signal. A combination of the spacing of the individual sensors, the length of the geophone array, and the wavelength bandwidths of the interference to be attenuated comprise the criteria for assigning the relative sensitivity to be employed at each geophone.

A good general review of the weighting of seismometer arrays is given by Parr and Mayne in Geophysics, Vol. 20, pages 539–564 (1955), and Holzman, in Geophysics, Vol. 28 (1963), discloses that the optimum attenuation of the effects of coherent horizontally-propagated seismic waves may be achieved by applying Chebychev weighting coefficients to the sensors in an array. The combined teachings of Parr, Parr and Mayne and Holzman are recognized standards for reducing the effects of the unwanted vibrational energy.

There have, however, been other proposals for reducing the amplitudes of the horizontally-propagated energy which is recorded. For example, in U.S. Pat. No. 2,747,172 (to Bayhi) two methods are disclosed for obtaining a tapered geophone array that is designed to have a response which attenuates the electrical signals produced in response to the unwanted vibrational energy. The first method involves constructing an array having a plurality of geophones at each location in the array. The number of geophones is maximum at the center point of the array and tapers off in the direction of the ends of the array.

The second method disclosed by Bayhi is to use a single geophone at each location of the array and to intall a voltage divider network across each geophone in the array. The voltage divider network at each geophone consists of resistors, and the values of the resistors used are chosen so that the geophone in the physical center of the array has the greatest sensitivity, while the geophones at the end of the array have the least sensitivity. The weighted geophone array of Bayhi is apparently not bidirectional, and it appears that difficulty in maintaining a substantially constant damping factor between all geophones in the array will be encountered with the array of Bayhi.

Later, in U.S. Pat. No. 3,096,846 to Savit, there is disclosed a method of determining the seismometer weights to be applied in array tampering by using a moveout criterion. The results of Savit's method is that the distance between individual seismic detectors in a given array may not be uniform and the sensitivity of the individual seismic detectors will vary according to the moveout criterion.

From practical considerations it has been found expedient to approximate a desired weighting by constructing an array having a plurality of seismic detectors at each location in the array (e.g., as taught by Bayhi), with the number of seismic detectors at each location dictating the weighting coefficient of that location. Since it is generally agreed that the Chebychev coefficients are the optimal weights and since these coefficients are not integral numbers, the actual number of individual seismic detectors that would be required to implement (even approximately) these coefficients is very large. Hence, for this practical reason, weighted arrays have not generally been attempted nor realized.

Two recent patents disclose apparatus for applying Chebychev weighting coefficients to the seismic detectors in an array. In U.S. Pat. No. 3,863,200 to Miller, there is disclosed a built-in seismometer amplifier which permits the sensitivity of the individual seismometer to be adjusted at a given location. It is believed that each seismometer disclosed in Miller requires a separate pair of wires to convey its output signal back to a suitable recording point, and, hence, a multi-pair cable is required between an array of seismometers and the recording point in the system disclosed by Miller.

In U.S. Pat. No. 3,863,201 to Briggs, there is disclosed a seismometer weighting apparatus to apply weighting coefficients to individual seismometer signals at a recording point. Briggs states that the apparatus may be utilized with a uniformly weighted and uniformly spaced array. It will be noted from the Briggs patent, however, that a multi-pair cable is required between the recording point and each detector in the array.

SUMMARY OF THE INVENTION

In one embodiment of the present invention a seismic array is provided which has bidirectional capabilities in that seismic data can be supplied to both ends of the array simultaneously. This embodiment comprises a plurality of seismic detector connection points and a seismic detector which is located at each seismic detector connection point. A first resistor is provided at each seismic detector connection point, and one end of the first resistor is connected to one terminal of the seismic detector. A pair of wires interconnects the seismic detector connection point and emerges from one end of the array. The first wire of the first pair is connected to the second end of the first resistor at each seismic detector connection point, and the second wire of the first pair is connected to the other output of each seismic detector. A second resistor is also provided at each seismic detector connection point, and one end of the second resistor is connected to one terminal of the seismic detector. A second pair of wires is provided which interconnects the seismic detector connection points and emerges from the second end of the array. The first wire of the second pair is connected to the second end of the second resistor at each seismic detector connection point, and the second wire of the second pair is connected to the second output of each seismic detector.

Weighting of the response of the seismic detectors in the array is accomplished by connecting one pair of wires emerging from the array to the inputs of an amplifier. The amplifier has a feedback network including a resistor, and the ratio of the resistor of the feedback network to the first resistor at each seismic detector connection point defines a ratio set. The elements of the ratio set determines the magnitude of signal appearing at the output of the amplifier from the response of the seismic detector at a given seismic detector connection point.

The defined ratio set may contain elements which apply any desired weighting to the response of the seismic detectors in the seismic array. In one embodiment of the seismic array of the present invention, the defined ratio set contains elements which are substantially equal. Yet another embodiment of the seismic array of the present invention contains elements which are Chebychev weighting coefficients. The number of seismic detector connection points in a preferred embodiment of the seismic array is 10, and a ratio set having Chebychev weighting coefficients is specified in Table I.

A second amplifier may be connected to the second pair of wires at the second end of the array. A second feedback network, including a resistor, is associated with the second amplifier, and the ratio of the resistor of the second feedback to the second resistor at each seismic detector connection point defines a ratio set. The elements of this ratio set determine the magnitude of signal appearing at the output of the second amplifier from the response of the seismic detector at a given seismic detector connection point.

The elements of the ratio set defined by the ratio of the resistor of the second feedback network to the second resistor at each seismic detector connection point may contain elements which are substantially equal or may be Chebychev weighting coefficients. When the preferred embodiment of the seismic array having ten seismic detector connection points is utilized, Chebychev weighting coefficients may be applied to the response of the seismic detectors by choosing the elements of the ratio set substantially in accordance with Table I.

A preferred embodiment of the seismic array of the present invention comprises a plurality of seismic detector connection points and a seismic detector at each seismic detector connection point. First and second resistors are provided at each seismic detector connection point. One end of the first resistor is connected to one output of the seismic detector, and one end of the second resistor is connected to the other output of the seismic detector. A first pair of wires is provided which interconnects the seismic detector connection points and which emerges from the first end of the seismic array. The first wire of the first pair is connected to the second end of the first resistor at each seismic detector connection point, and the second wire of the first pair is connected to the second end of the second resistor at each seismic detector connection point.

The preferred embodiment of the seismic array of the present invention further includes third and fourth resistors at each seismic detector connection point. One end of the third resistor is connected to one output of the seismic detector, and one end of the fourth resistor is connected to the second output of each seismic detector. This preferred embodiment further includes a second pair of wires which interconnects the seismic detector connection points and which emerges from the second end of the array. The first wire of the second pair is connected to the second end of the third resistor at each seismic detector connection point, and the second wire of the second pair is connected to the second end of the fourth resistor at each seismic detector connection point.

Weighting of the response of the seismic detectors in the array may be accomplished by connecting the first pair of wires to the inputs of an amplifier. A feedback network, including a resistor, is associated with the amplifier, and the ratios of this resistor to the first resistor and to the second resistor at each seismic detector connection point defines a ratio set. The elements of the ratio set determine the magnitude of the signal appearing at the output of the amplifier from the response of the seismic detectors in the array.

The elements contained in the defined ratio set may be substantially equal or may be Chebychev weighting coefficients. The number of seismic detector connection points in a preferred embodiment of the seismic array is equal to ten, and Chebychev weighting coefficients for this size array are specified in Table I.

The preferred embodiment of the seismic array of the present invention may further include a second amplifier which is coupled to the second pair of wires which emerge from the second end of the array. A feedback network, including a resistor, is associated with this second amplifier. The ratio of the resistor of this feedback network to the third and fourth resistors at each seismic detector connection point defines a ratio set and determines the magnitude of the signal appearing at the output of the second amplifier from the response of the seismic detectors in the array. The defined ratio set may contain elements which are substantially equal or may contain Chebychev weighting coefficients. Chebychev weighting coefficients are specified in Table I for the preferred embodiment of the seismic array which has ten seismic detector connection points.

In yet another embodiment of the present invention a seismic array is provided having unidirectional capabilities. This array comprises a plurality of seismic detector connection points with a seismic detector located at each seismic detector connection point. A damping resistor is coupled across the terminals of the seismic detector at each seismic detector connection point, and the value of the damping resistor varies between seismic detector connection points. A weighting resistor is provided at each seismic detector connection point and one terminal of the weighting resistor is connected to one terminal of the seismic detector. A pair of wires is additionally provided which interconnects all seismic detector connector points in the array. One wire of the pair is connected to the second terminal of the weighting resistor at each seismic detector connection point, and the second wire of the pair is connected to the second terminal of the seismic detector at each seismic detector connection point. The pair of wires emerges from one end of the seismic array.

This embodiment of seismic array additionally comprises an amplifier whose inputs are adapted to be coupled to the pair of wires emerging from the end of the array.

The amplifier has a feedback network, including a resistor, and the ratio of the value of the feedback resistor to the weighting resistor at each seismic detector connection point defines the elements of a ratio set and determines the magnitude of the signal appearing at the output of the amplifier from the seismic detector at a given seismic detector connection point. Chebychev weighting may be achieved by proper choice of the values of the feedback resistor and the weighting resistors at each seismic detector connection point.

In yet another embodiment of the present invention, a unidirectional seismic array is provided which includes a plurality of seismic detector connection points. A seismic detector is located at each seismic detector connection point, and a damping resistor in connected across the terminals of the seismic array at each seismic detector connection point. Two weighting resistors are provided at each seismic detector connection point and the first terminals of the two weighting resistors are connected to respective terminals of the seismic detector. The seismic array also includes a pair of wires which interconnects all seismic detector connection points in the array. The second terminals of the two weighting resistors at each seismic detector connection point are connected to respective wires of the pair of wires, and the pair of wires emerges from one end of the array.

This seismic array additionally comprises an amplifier, whose inputs are adapted to be coupled to the pair of wires emerging from the end of the array. Associated with the amplifier is a feedback network including a resistor. The value of the feedback resistor to the sum of the value of the two weighting resistors at each seismic detector connection point defines the elements of ratio set and determines the magnitude of the signal appearing at the output of the amplifier from a given seismic detector. Chebychev weighting of the response of the seismic detectors in the array may be achieved by proper choice of the value of the feedback and weighting resistors.

BRIEF DESCRIPTION OF THE DRAWINGS

In the accompanying drawings:

FIGS. 3a-3c are electrical schematic diagrams which illustrate various amplifier configurations for use with the seismic array of the present invention.

FIG. 7 is an electrical schematic diagram which illustrates an embodiment of a unidirectional seismic array in accordance with the present invention.

FIG. 8 is an electrical schematic diagram which illustrates another embodiment of a unidirectional seismic array in accordance with the present invention.

DESCRIPTION OF THE PREFERRED EMBODIMENTS

It will be appreciated that the present invention can take many forms and embodiments. Several embodiments of the invention will be illustrated so as to give an understanding of the invention. It is not intended, however, that the limited embodiments herein set forth should in any way limit the true scope and spirit of the invention.

The terms "seismic array" and "seismic detector connection point" are frequently utilized in this specification. The term "seismic array" is utilized to designate a cable having seismic detectors for use in seismic exploration operations and is intended to embrace such equivalent terms as "seismic stringer" or "seismic cable". The term "seismic detector connection point" is utilized to designate locations in the seismic array at which the seismic detectors are located.

Figure 1:
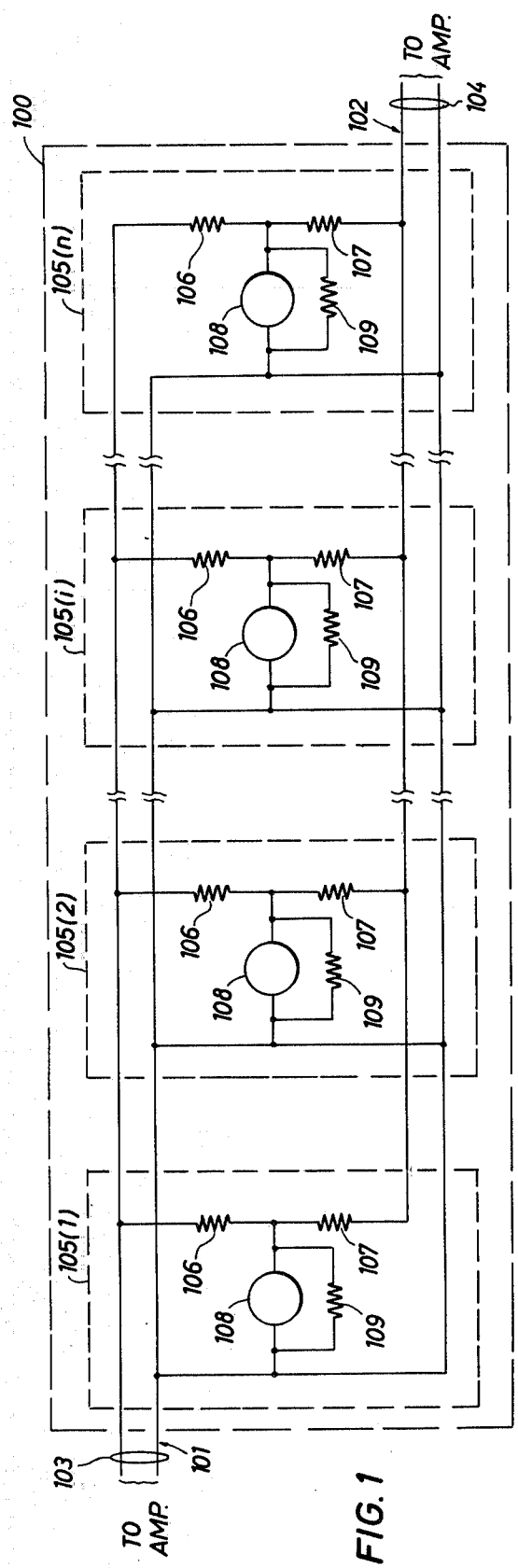
FIG. 1 is an electrical schematic diagram which illustrates the components comprising one embodiment of the seismic array of the present invention.

Referring to FIG. 1, an embodiment of the seismic array 100 comprises a plurality of seismic detector connection points 105(1)-105(n), and the seismic detector connection points 105(1)-105(n) are located at spaced intervals along the length of seismic array 100. The total number, n, of seismic detector connection points in seismic array 100 may vary depending upon the region of the earth in which the array is used. This being the case, the elements comprising each seismic detector connection point 105(1)-105(n) will be described with respect to a generalized seismic detector connection point 105(i), where i equals 1, 2, . . . n.

Still referring to FIG. 1, seismic detector connection point 105(i) first comprises seismic detector 108. Seismic detector 108 is preferably a two-terminal device and the design and natural frequency of seismic detector 108 may be chosen according to any desired criteria. It is preferable, however, that the design and natural frequency of all seismic detectors 108 at seismic detector connection points 105(1)-105(n) are identical. Seismic detector connection point 105(i) may additionally comprise a damping resistor 109 which is connected across the terminals of seismic detector 108.

Still referring to FIG. 1, seismic array 100 further comprises a first resistor 106 at each seismic detector connection point. One end of resistor 106 is connected to one output of seismic detector 108.

Still referring to FIG. 1, the illustrated embodiment of seismic array 100 further comprises a first pair of wires 103. The first pair of wires 103 interconnects all the seismic detector connection points 105(i) in seismic array 100. The second terminal of resistor 106 at each seismic detector connection point 105(i) is connected to one wire of pair 103, and the other wire of pair 103 is connected to the second terminal of seismic detector 108 at each seismic detector connection point 105(i). Pair 103 emerges from the first end 101 of seismic array 100.

Still referring to FIG. 1, the illustrated embodiment of seismic array 100 further comprises a second resistor 107 at each seismic detector connection point 105(i). One end of resistor 107 is connected to one terminal of seismic detector 108 at each seismic detector connection point 105(i) of the array.

Still referring to FIG. 1, the illustrated embodiment of seismic array 100 further comprises a second pair of wires 104 which interconnects each seismic detector connection point 105(i) in array 100. The second end of resistor 107 at each seismic detector connection point 105(i) is connected to one wire of pair 104, and the other wire of pair 104 is connected to one terminal of seismic detector 108 at each seismic detector connection point 105(i). The second pair of wires 104 emerges at the second end 102 of seismic array 100.

Now referring to FIG. 3a, an embodiment of the seismic array 100 (FIG. 1) may additionally comprise amplifier 400. The inputs of amplifier 400 are adaptable to be connected to the pair of wires 103 or 104 which emerge from the opposite ends of seismic array 100 (FIG. 1). Associated with each amplifier is a feedback network including a resistor 401.

Referring to both FIGS. 1 and 3a, when a shockwave is imparted into the earth's crust, the seismic detectors 108 at each seismic detector connection point 105(i) begin to vibrate. This vibration produces a voltage at the output of each seismic detector 108. When the inputs of amplifier 400 are coupled to pair 103, the voltage produced by each seismic detector 108 causes a current to flow via resistor 106 into the input of amplifier 400. Still referring to both FIGS. 1 and 3a, the input to amplifier 400 acts as a summing junction for the current produced by the seismic detectors 108 at each seismic detector connection point 105(i). The magnitude of the signal appearing at the output of amplifier 400 from the response of any seismic detector 108 is determined by the ratio of resistor 401 to resistor 106 at that seismic detector connection point. It is seen, therefore, that the ratio of resistor 401 to resistor 106 at each seismic detector connection point 103(i) defines a ratio set having a number of elements equal to the number, n, of seismic detector connection points in the seismic array 100. It should be apparent, therefore, that the contribution to the signal appearing at the output of amplifier 400 from seismic detector 108 at any seismic detector connection point 105(i) can be weighted by a proper choice of the ratio of resistor 401 to resistor 106 at that seismic detector connection point 105(i).

Still referring to both FIGS. 1 and 3a, in some situations it may be desirable to uniformly weight the response of each seismic detector 108 in the seismic array 100. If this is the case, the values of resistor 401 and resistor 106 at each seismic detector connection point 105(i) will be equal.

In most instances, however, it is desirable to weight the response of the seismic detectors 108 so that the seismic detector which is physically nearest the amplifier makes a maximum contribution to the output of amplifier 400, while the seismic detector which is physically farthest from the amplifier makes a minimum contribution to the output of the amplifier. When pair 103 (FIG. 1) is connected to the inputs of amplifier 400 (FIG. 3a), seismic detector 108 at seismic detector connection point 105(l) is the seismic detector which is physically nearest the amplifier, while seismic detector 108 at seismic detector connection point 105(n) is the seismic detector farthest from the amplifier. The ratio of resistor 401 (FIG. 3a) to resistor 106 at seismic detector connection point 105(l) should, therefore, be larger than the ratio of resistor 401 to resistor 106 at any other seismic detector connection point 105(i).

It has been discussed that the Chebychev weighting coefficients are the optimal weights which may be applied to the response of the seismic detectors comprising seismic array 100. It is apparent, of course, that the ratio set defined by the ratio of resistor 401 to resistor 106 at each seismic detector connection point 105(i) should contain elements which are Chebychev weighting coefficients when Chebychev weighting is desired. It has been found that for most applications the preferred number, n, of seismic detector connection points in seismic array 100 is ten. When pair 103 is connected to the input of amplifier 400 and when seismic array 100 comprises ten seismic detector connection points, a ratio set containing Chebychev weighting coefficients may be applied to the response of each seismic detector 108 by choosing the ratio of resistor 401 to resistor 106 at each seismic detector connection point in accordance with Table I below.

TABLE I

| SEISMIC DETECTOR CONNECTION POINT | 1 | 2 | 3 | 4 | 5 | 6 | 7 | 8 | 9 | 10 |
|---|---|---|---|---|---|---|---|---|---|---|
| RATIO OF R401 TO R106 | 1.00 | .96 | .88 | .77 | .65 | .51 | .38 | .26 | .17 | .12 |

Referring still to FIGS. 1 and 3a, the above discussion has assumed that only pair 103 has been connected to the inputs of an amplifier. The embodiment of seismic array 100 (FIG. 1) may additionally comprise a second amplifier whose inputs are connected to 104. The second amplifier is preferably identical to amplifier 400 (FIG. 3a). A feedback network including a resistor is associated with this second amplifier, and it will be observed that the contribution to the output of this second amplifier from a seismic detector 108 at any seismic detector connection point 105(i) can be weighted by the ratio of the feedback resistor to resistor 107 at that seismic detector connection point. Chebychev weighting coefficients may again be applied to the response of seismic array 100 by choosing the ratio of the resistor in the feedback network of the second amplifier to the ratio of resistor 107 in accordance with the criteria set forth in Table I. It will be apparent, of course, that seismic detector 108 at seismic detector connection point 105(n) should make the greatest contribution to the output of the second amplifier, while seismic detector 108 at seismic detector connection point 105(l) should make the least contribution to the output of the second amplifier. In other words, if a Chebychev weighted array is desired, resistor 107 at seismic detector connection 105(n) should be equal to resistor 106 at seismic detector connection point 105(l), resistor 107 at seismic detector connection point 105(n-1) should be equal to resistor 106 at seismic detector connection point 105(2), etc. Hence, it is seen that the embodiment of seismic array 100 illustrated in FIG. 1 may provide a Chebychev-weighted response to the amplifiers at two adjacent recording points simultaneously.

Figure 2:
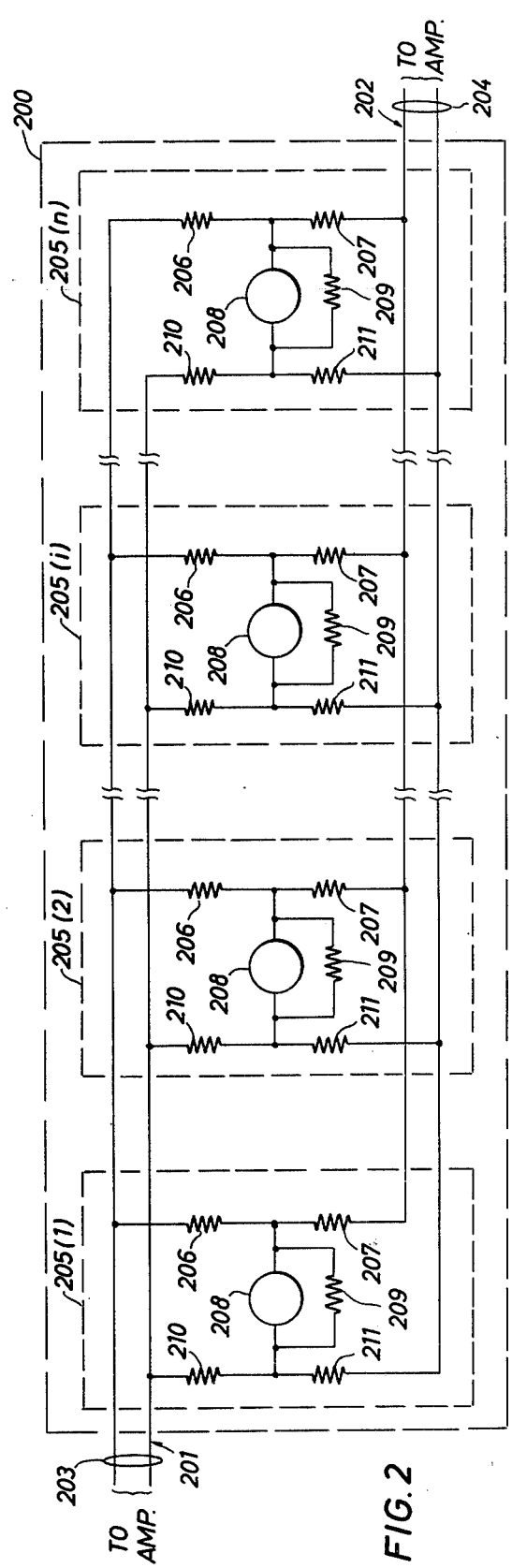
FIG. 2 is an electrical schematic diagram which illustrates components comprising another embodiment of the seismic array of the present invention.

With reference now to FIG. 2, there is illustrated a preferred embodiment of seismic array 200 of the present invention. This embodiment comprises a plurality of seismic detector connection points 205(l)–205(n). The description of the components comprising each seismic detector connection point will again be described with reference to a generalized seismic detector connection point 205(i), where i equals 1, 2, . . . n.

Each seismic detector connection point 205(i) of seismic array 200 comprises a seismic detector 208. As was the case with seismic detector 108 (FIG. 1), the design and natural frequency of seismic detector 208 may be chosen in accordance with a particular criteria, but the design and natural frequency characteristics of all the seismic detectors 208 in the array are preferably identical. Seismic detector 208 is also a two-terminal device, and a damping resistor 209 may be connected across the terminals of seismic detector 208, if required.

Seismic array 200 further comprises a first resistor 206 and a second resistor 210 at each seismic detector connection point 205(i). One terminal of resistor 206 is connected to one terminal of seismic detector 208 and one terminal of resistor 210 is connected to the other terminal of seismic detector 208.

Still referring to FIG. 2, the illustrated embodiment of seismic array 200 further comprises a first pair of wires 203 which interconnects all the seismic detector connection points 205(l)–205(n) in the array. At each seismic detector connection point 205(i) the second end of resistor 206 is coupled to one wire of pair 203, and the second terminal of resistor 210 is coupled to the second wire of pair 203. Pair 203 emerges from end 201 of seismic array 200.

Still referring to FIG. 2, the embodiment of seismic array 200 further comprises a third resistor 207 and a fourth resistor 211 at each seismic detector connection point 205(i). One end of resistor 207 is connected to one terminal of seismic detector 208, and one end of resistor 211 is connected to the other terminal of seismic detector 208.

Still referring to FIG. 2, the illustrated embodiment of seismic array 200 further comprises a second pair of wires 204 which interconnects all seismic detector connection points 205(l)–205(n) in the array. At each seismic detector connection point 205(i) the second end of resistor 207 is connected to one wire of pair 204 and the second end of resistor 211 is connected to the second wire of pair 204. Pair 204 emerges from end 202 of seismic array 200.

Referring now to FIGS. 2 and 3a, the preferred embodiment of seismic array 200 additionally comprises amplifier 400, whose inputs are connected to pair 203 emerging from end 201 of the array. The ratio of resistor 401 to the sum of resistances of resistors 206 and 210 determines the contribution of seismic detector 208 to the output of amplifier 400. As was discussed with respect to FIG. 1, uniform, Chebychev, or any other weighting may be applied to the response of the seismic detectors in seismic array 200 by the ratio of resistor 401 to the sum of resistors 206 and 210. The preferred embodiment of seismic array 200 also comprises ten seismic detector connection points, and, if a Chebychev weighted array is desired, the ratio of resistor 401 to the sum of resistances 206 and 210 should be chosen in accordance with Table I set forth above.

Still referring to FIGS. 2 and 3a, an embodiment of seismic array 200 may additionally comprise a second amplifier whose inputs are connected to pair 204. This second amplifier is preferably identical to amplifier 400 and has a feedback network, including a resistor 401, associated with it. The ratio of this resistor to the sum of resistors 207 and 211 determine the contribution of a given seismic detector connection point 205(i) to the output of this second amplifier.

Referring to FIGS. 1 and 2, the total length of a seismic array in accordance with the present invention and the distance between adjacent seismic detector connection points in the array is determinative of the wavelengths of seismic waves which will be attenuated when the cable is utilized in seismic exploration operations. It is common for seismic exploration crews to have knowledge of the range of wavelengths of unwanted seismic waves which are desired to be attenuated during seismic operations. In the absence of this knowledge, it is common for the seismic exploration crew to run a "test shot" to determine the range of wavelengths of these undesired vibrations. Once the range of undesirable wavelengths is determined, the total length of the seismic array should be such that it is greater than the wavelength of the seismic wave having the lowest undesirable frequency (i.e., greater than the longest undesirable wavelength). In addition, the distance between adjacent seismic detector connection points, e.g., 105(l)–105(2), 105(2)–105(3), etc. in FIG. 1, should be chosen such that it is less than or equal to the wavelength of the seismic wave having the highest undesirable frequency (i.e., the shortest undesirable wavelength). Choosing the total length of the array and the distance between adjacent seismic detector connection points of the array in accordance with the above criteria insures that peaks (or valleys) of the highest undesirable frequency will not occur at adjacent seismic detector connection points and that peaks (or valleys) of seismic waves of the lowest undesirable frequency will not appear simultaneously at the ends of the array. In accordance with the preferred embodiment of the seismic array comprising ten seismic detector connection points, a total length of the array is 330 feet, and the distance between adjacent seismic detector connection points is 33 feet.

Figure 5:
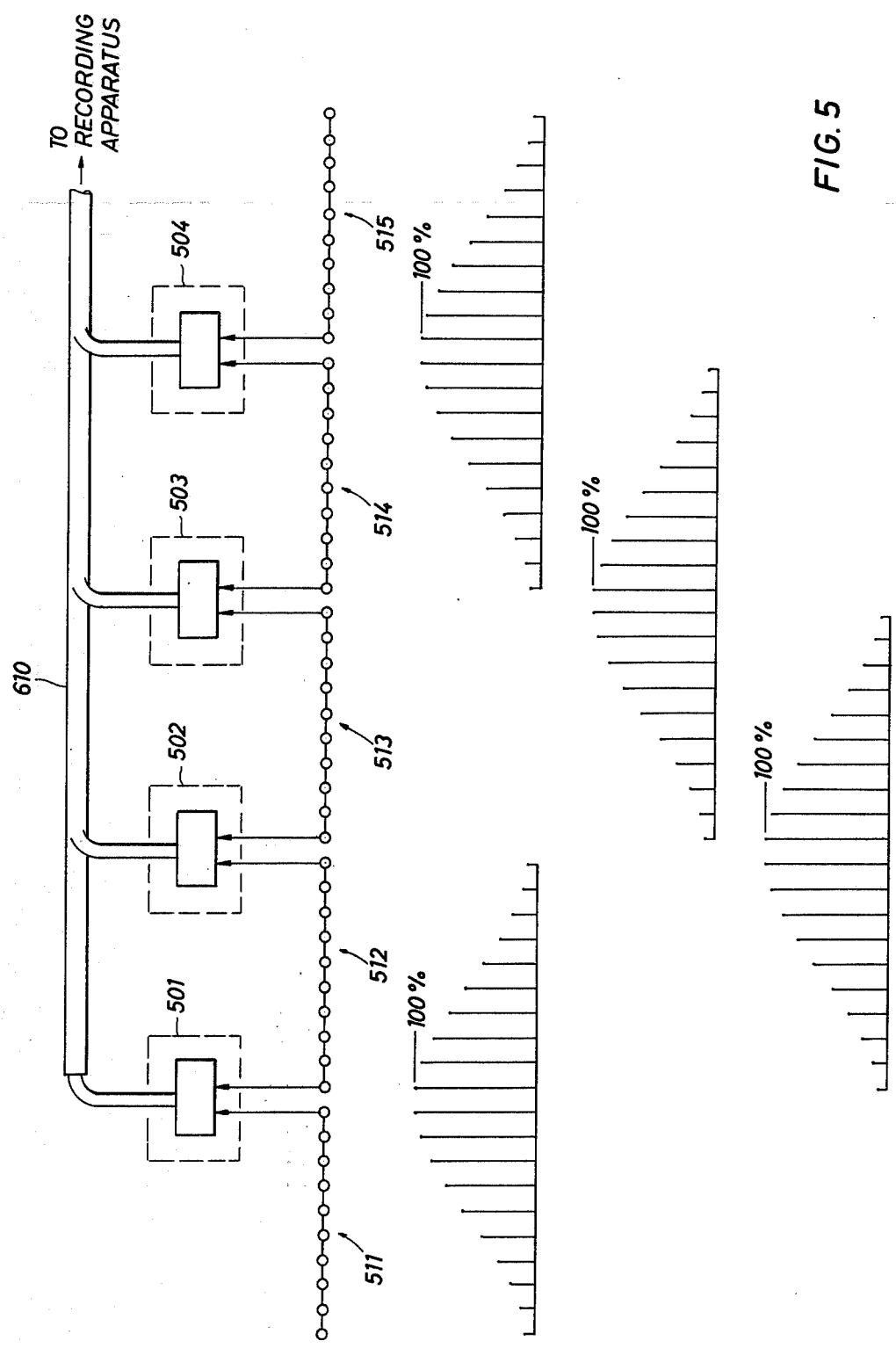
FIG. 5 is a pictorial representation of a recording system utilizing the bidirectional capabilities of the improved seismic array of the present invention.

With reference now to FIG. 5, there is illustrated a four-channel recording system which employs a plurality of seismic arrays which are constructed in accordance with the present invention. As shown, the four-channel recording system comprises four recording stations 501–504 and five seismic arrays 511–515.

Still referring to FIG. 5, the four-channel recording system additionally comprises cable 510 which is a multi-pair cable. One pair of wires of cable 510 is "taken out" of the cable at each recording station 501–504. Seismic data from each recording point 501–504 is supplied to the recording apparatus (not shown) over the pair of wires which is taken out at each recording point.

Still referring to FIG. 5, the illustrated four-channel recording system employs the bidirectional capabilities of a seismic array constructed in accordance with the present invention. For example, the ends of seismic array 512 are connected to the inputs of recording stations 501 and 502. It will further be observed that each recording station 501-504 receives an input from the response of two seismic arrays. The signal supplied to the recording apparatus by the output of each recording station is, therefore, a sum of the responses of the seismic arrays which provide data to its inputs. When Chebychev weighting coefficients are applied to the response of the seismic detectors in seismic arrays 511-515, the line graphs in FIG. 5 illustrate the contribution of the various seismic detectors in each array to the output signal of each recording point.

Figure 6:
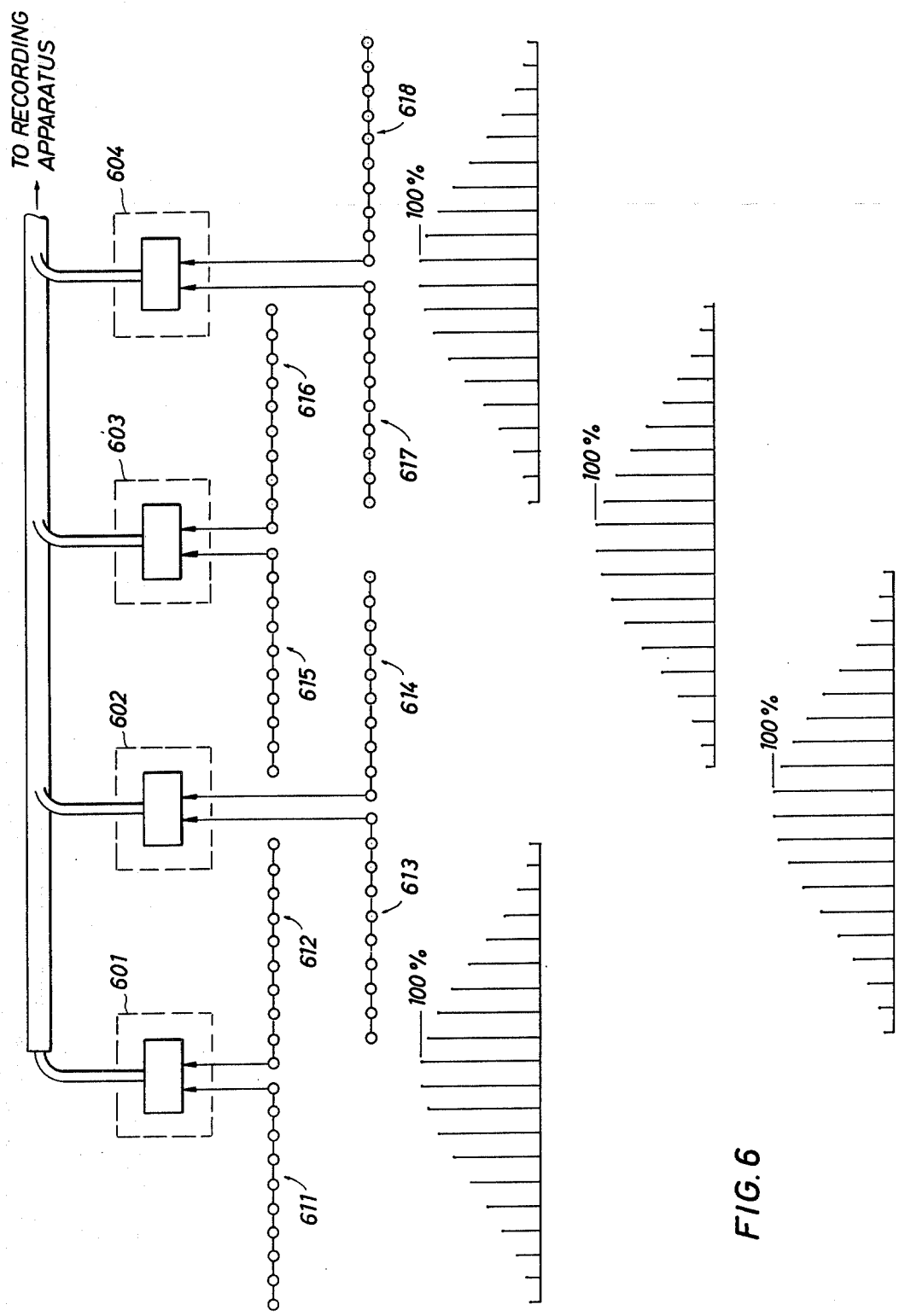
FIG. 6 is a pictorial representation of a recording system which utilizes the unidirectional capabilities of the improved seismic array of the present invention.

Referring now to FIG. 6, there is illustrated another four-channel recording system which utilizes a plurality of seismic arrays in a unidirectional mode of operation. This recording system also comprises four recording stations 601-604 and eight seismic arrays 611-618. The recording system also comprises a main recording cable 625, which is a multi-pair cable. One pair of wires of cable 625 are taken out of the cable at each recording station 601-604. Seismic data from each recording station is supplied to the recording apparatus (now shown) over the pair of wires which is taken out of cable 625 at each recording point 601-604. Still referring to FIG. 6, each recording station 601-604 receives an input signal from the response of two seismic arrays. For example, the input signal to recording station 601 is the response of seismic arrays 611 and 612. The output signal from each recording point 601-604 is a combination of the responses of the two seismic arrays which supply data to it. When Chebycev weighting coefficients are applied to the responses of the individual seismic detectors in each seismic array 611-618, the contribution of each seismic detector to the output of each recording point 601-604 is illustrated in the line graphs of FIG. 6.

Figure 4:
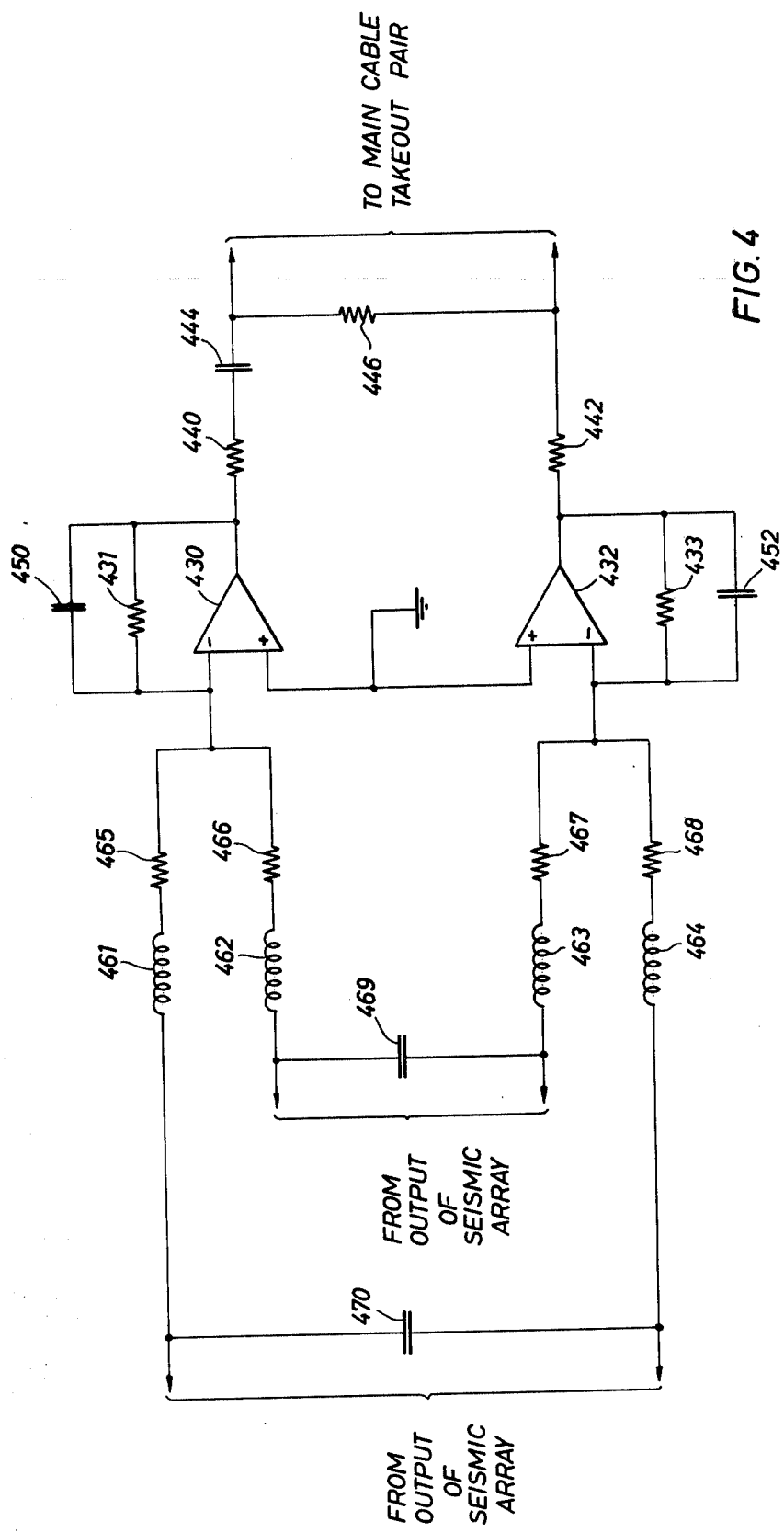
FIG. 4 is an electrical schematic diagram which illustrates a preferred embodiment of an amplifier configuration for use with the seismic array of the present invention.

Referring now to FIGS. 3b-3c and 4, there are illustrated embodiments of amplifier configurations which may be utilized at the recording stations of FIGS. 5 and 6. Each of these amplifier configurations receives the response of two seismic arrays at its inputs and combines the two responses at its output. Each amplifier configuration provides isolation between the output signals from each seismic array.

The amplifier configuration of FIG. 3b comprises two operational amplifiers 410 and 412. The non-inverting inputs of operational amplifiers 410 and 412 are each connected to a common ground, and this common ground is one of the outputs of the amplifier configuration. Feedback resistors 411 and 413 are connected between the inverting input and the output of operational amplifiers 410 and 412, respectively. One end of resistors 414 and 415 is connected to the outputs of operational amplifiers 410 and 412, respectively, and the second ends of resistors 414 and 415 are connected at a common point. This common point connection provides the second output of the amplifier configuration. The two outputs of the amplifier configuration are suitable for connection to the pair of wires which are taken out of the main recording cables in FIGS. 5 and 6.

Still referring to FIG. 3b, the inverting and non-inverting inputs of operational amplifiers 410 and 412 may be connected to the pair of wires emerging from either end of the embodiments of the seismic arrays illustrated in FIGS. 1 and 2. The signals received from the arrays are summed at the outputs of operational amplifiers 410 and 412. The ratio of resistor 411 to the weighting resistor at each seismic detector connection point in the array supplying a signal to operational amplifier 410 determines the contribution of each seismic detector to the output of operational amplifier 410. An identical function is performed by resistor 413.

The amplifier configuration illustrated in FIG. 3c, comprises a single operational amplifier 420 and a feedback resistor 421. Feedback resistor 421 is connected between the inverting input and the output of the operational amplifier 420, and the output of operational amplifier 420 may be connected directly to one wire of the pair of wires taken out of a main recording cable at a recording point (see FIGS. 5 and 6). The non-inverting input of operational amplifier 420 is connected to a common ground, and this common ground may be connected to the other wire of the pair of wires taken out of the main recording cable at each recording point. The pair of wires emerging from either end of a seismic array (see FIGS. 1 and 2) may each be connected to the inverting and non-inverting inputs of operational amplifier 420. The ratio of feedback resistor 421 to the weighting resistor employed at a seismic detector connection point in either array determines the contribution of the seismic detector at that seismic detector connection point to the output of operational amplifier 420.

Referring now to FIG. 4, there is illustrated the preferred embodiment of an amplifier configuration for use with the seismic array of the present invention. This embodiment comprises operational amplifiers 430 and 432 and feedback resistors 431 and 433. Feedback resistors 431 and 433 are connected between the inverting input and the output of operational amplifiers 430 and 432, respectively. This preferred embodiment further comprises capacitors 450 and 452, which are connected in parallel with feedback resistors 431 and 433, respectively. Capacitors 450 and 452 function to prevent signals having frequencies above the seismic band of interest, e.g., above 500 Hz, from appearing at the outputs of operational amplifiers 430 and 432, respectively. Capacitors 450 and 452 are preferably 0.01 mfd in value.

Still referring to FIG. 4, the preferred embodiment of the amplifier also comprises current limiting resistors 440 and 442. The outputs of operational amplifiers 430 and 432 are coupled to the first terminals of resistors 440 and 442. When the output of the amplifier configuration is connected to a pair of wires of a main recording cable, resistors 440 and 442 will limit the current back into the output of each operational amplifier 430 and 432, should a voltage surge appear on the recording cable. Resistors 440 and 442 are preferably 6.2 ohms in value.

Still referring to FIG. 4, the preferred embodiment of the amplifier further comprises capacitor 444 and resistor 446. The first terminal of capacitor 444 is connected to the second terminal of resistor 440, and the terminals of resistor 446 is connected between the second terminals of capacitor 444 and resistor 442. Capacitor 444 prevents any DC offset from appearing in the signal at the output of the amplifier configuration, and resistor 446 provides a discharge path for capacitor 444. Capacitor 444 is preferably 56 mfd in value, and resistor 446 has a nominal value of 10K ohms. The output of the amplifier configuration is across resistor 446, and one terminal of resistor 446 may be connected to one wire of the pair of wires taken out of a main recording cable at each recording point (see FIGS. 5 and 6).

Still referring to FIG. 4, the preferred embodiment of the amplifier configuration further comprises inductors 461–464, resistors 465–468 and capacitors 469 and 470. Inductor 461 and resistor 465 are connected in series, with one terminal of resistor 465 connected to the inverting input of operational amplifier 430. Inductor 462 and resistor 466 are connected in series, with one terminal of resistor 466 also connected to the inverting input of operational amplifier 430. Inductor 463 is connected in series with resistor 467, and inductor 464 is connected in series with resistor 468. One terminal of resistors 467 and 468 is connected to the inverting input of operational amplifier 432. Capacitor 469 is connected between one terminal of inductor 462 and one terminal of inductor 463, and capacitor 470 is connected between one terminal of inductor 461 and one terminal of inductor 464. The non-inverting inputs of operational amplifiers 430 and 432 are grounded. Inductors 461–464 are preferably 10 mh in value, capacitors 469 and 470 are preferably 0.1 mfd in value and resistors 465–468 are preferably 562 ohms in value.

The preferred embodiment of the amplifier illustrated in FIG. 4 is designed to be primarily utilized with the embodiments of the seismic array illustrated in FIG. 2, and the outputs from two seismic arrays may be connected to the inputs of this amplifier configuration. The output from one seismic array may be connected between the terminals of inductors 461 and 464, and the output from a second seismic array may be connected between the terminals of inductors 462 and 463. It will be observed that the outputs of the connected seismic arrays will be summed at the inverting inputs of operational amplifiers 430 and 432.

The separate inductor-resistor-capacitor (LRC) circuit at the input to each operational amplifier 430 and 432 minimizes the cross-feed between the outputs of the arrays connected to the inputs of the amplifier configuration. This cross-feed could propagate from array to array if the LRC circuit were not employed.

Referring to both FIGS. 2 and 4, suppose that the wires of pair 204 of seismic array 200 (FIG. 2) are connected to terminals of inductors 461 and 464 (FIG. 4), with the wire of pair 204 which is connected to resistors 207 being connected to the terminal of inductor 461 and with the wire of pair 211 which is connected to resistors 211 being connected to the terminal of inductor 464. In this instance, the magnitude of the signal appearing at the output of operational amplifiers 430 and 432 (FIG. 4) from the response of any seismic detector 208 is determined by the ratio of resistor 431 to resistor 207 at that seismic detector connection point and the ratio of resistor 433 to resistor 211 at that seismic detector connection point. Chebychev weighting of the response of seismic array 200 may be achieved by choosing the ratio of resistor 431 to resistor 207 and the ratio of resistor 433 to resistor 207 in accordance with Table I above.

In each of the amplifier configurations illustrated in FIGS. 3b–3c and 4, the voltage between the inverting and non-inverting inputs of the operational amplifiers is very small. Hence, when the output of a seismic array is connected to the inputs of any of the amplifier configurations, the amplifier configuration appears as a short circuit to the array. When, therefore, the bidirectional capabilities of the seismic array are utilized as in the recording system illustrated in FIG. 5, it appears to the array that a short circuit exists at each end of the array.

The Chebychev weighting coefficients set forth in Table I above are inversely proportional to the weighting resistors which are utilized at any seismic detector connection point. When a short circuit is placed across the pair of wires emerging from both ends of an array having Chebychev weighting coefficients substantially as specified by Table I, it will be observed that the parallel combination of the weighting resistors at all seismic detector connection points in the array are substantially equal. Hence, a substantially constant damping factor exists between all seismic detectors in the seismic array.

When, however, the seismic array of the present invention is utilized to supply data to only one recording point, a short circuit must be placed across the end of the array which is not connected to the inputs of an amplifier. This short circuit connection would be required, for example, at the ends of arrays 511 and 515 (FIG. 5) which are distal from recording points 501 and 504, respectively. Also, this short circuit connection would be required at the ends of each seismic array 611–618 which are not connected to the recording points 601–604 in FIG. 6.

It will be appreciated that a seismic array having a substantially constant damping factor among all seismic detectors in the array may also be achieved when other types of weighting is applied to the response of the seismic detectors in the array. For example, when substantially uniform weighting coefficients are applied to the response of the seismic detectors in the array, a substantially constant damping factor will be achieved between seismic detectors in the array when it appears to the array that a short circuit exists at both ends of the array.

Each of the embodiments of the seismic array of the present invention heretofore described have had bi-directional capabilities, i.e., seismic data may be supplied to opposite ends of the array simultaneously. A bi-directional array is achieved by connecting the pair of wires that emerges from one end of the array to the inputs of a first amplifier, and by connecting the pair of wires that emerges from the second ends of the array to the inputs of a second amplifier. Since each amplifier appears to be short circuit to each seismic detector in the array, the response of each seismic detector is electrically isolated from the responses of the other seismic detectors in the array.

Referring now to FIG. 7, the concept of electrically isolating of the responses of the individual seismic detectors in the array may also be utilized to achieve a seismic array having unidirectional capabilities. Unidirectional seismic array 700 comprises a plurality of seismic detector connection points 705 (1)–705 (n), which are located at spaced intervals along the length of the array. Since the total number, n, of seismic connection points in the array may vary depending upon the region of the earth in which the array is used, the elements comprising each seismic detector connection point are described with respect to a generalized seismic connection point 705 (i), where i equals 1,2...n.

Seismic detector connection point 705 (i) first comprises seismic detector 708, which is preferably a two-terminal device, and the design and natural frequency of seismic detector 708 are preferably indentical for each seismic detector connection point in the array. Seismic detector connection point 705 (i) further comprises damping resistor 709(i), and the value of damping resistor 709(i) will vary among seismic detector connection points in the array. A weighting resistor 706(i) is also provided at each seismic detector connection point 706(i) in the array, and the first end of resistor 706(i) is connected to one terminal of the seismic detector 708. Seismic array 700 further comprises a pair of wires 703, which interconnects all the seismic detector connection poings 705(i) in the array. The second terminal of resistor 706(i) at each seismic detector connection point 705(i) is connected to one wire of pair 703, and the other wire of pair 703 is connected to the second terminal of seismic detector 708 at each seismic detector connection point 705(i). Pair 703 emerges from one end of the seismic array 700.

Referring now to both FIGS. 3a and 7, an embodiment of seismic array 700 (FIG. 7) may additionally comprise amplifier 400, and the inputs of amplifier 400 are adaptable to be connected to the pair of wires 703, which emerge from seismic array 700. Associated with amplifier 400 is a feedback network, including a resistor 401.

Still referring to FIGS. 3a and 7, seismic array 700 functions similarly to the embodiments of the seismic array heretofore described. The ratio of the value of resistor 401 to the value of weighting resistor 706(i) at each seismic detector connection point 705(i) defines the elements of a ratio set. When a shock wave is imparted into the earth's crust, the element of the ratio set defined for a given seismic detector connection point 705(i) determines the magnitude of the signal appearing at the output of amplifier 400 from the seismic detector at that point. If the value of feedback resistor 401 and each weighting resistor 706(i) have equal values, uniform weighting of the responses of the seismic detectors in the array achieved. Alternatively, Chebychev weighting of the response of the seismic detectors in the array is achieved by choosing the ratio of the value of feedback resistor 401 to the value of weighting resistor 706(1)–706(n) in accordance with Table I above.

When amplifier 400 is connected to the pair of wires 703 emerging from the end of the array, amplifier 400 appears as a short circuit to the seismic detectors in the array. Hence, damping resistor 709(i) and weighting resistor 706(i) are effectively in parallel at each seismic detector connection point 705(i). Since it is desirable to maintain a substantailly constant damping factor between seismic detectors in the array, the values of damping resistor 709(i) and weighting resistor 706(i) should be chosen such that their parallel combination is substantially identical at each seismic detector connection point 705(i).

Referring now to FIG. 8, seismic array 800 comprises a plurality of seismic detector connection points 805(l)–805(n), which are located at spaced intervals along the length of the array. The elements comprising each seismic detector connection point are described with respect to a generalized seismic detector connection point 805(i), where i equals 1,2...n.

Seismic detector connection point 805(i) first comprises seismic detector 808, which is preferrably a two-terminal device, and the design and natural frequency of seismic detector 808 are preferrably identical at each seismic detector connection point in the array. Seismic detector connection point 805(i) further comprises two weighting resistors 806(i) and 807(i), and the first terminals of these weighting resistors are connected to respective terminals of seismic detector 808. A damping resistor 809(i) is also provided at each seismic detector connection point 805(i), and damping resistor 809(i) is connected across the terminals of seismic detector connection points 805(i) in the array. The second terminals of weighting resistor 806(i) and 807(i) are connected to respective wires of pair 803, and one end of pair 803 emerges from one end of seismic array 800.

Referring now to FIGS. 3a–3c and 8, an embodiment of seismic array 800 (FIG. 8) may additionally comprise amplifier 400 (FIG. 3a) and the inputs of amplifier 400 are adaptable to be connected to the pair of wires 803, which emerge from seismic array 800. Associated with amplifier 400 is a feedback network, including a resistor 401 to the sum of the values of weighting resistor 806(i) and 807(i) at each seismic detector connection point 805(i) defines the elements of a ratio set. When a shock wave is inparted into the earth's crust, the element of the ratio set defined for a given seismic detector connection point 805(i) determines the magnitude of the signal appearing at the output of amplifier 400 from the seismic detector at that point. If the value of feedback resistor 401 and the sum weighting resistor 806(i) and 807(i) are equal, uniform weighting of the responses of the seismic detectors in the array is achieved. Alternatively, Chebychev weighting of the response of the seismic detectors in the a-ray is achieved by choosing the ratio of the value of feedback resistor 401 to the values of weighting resistors 806(i) and 807(i) in accordance with Table I above.

When amplifier 400 is connected to the pair of wires 803, emerging from the end of the array, amplifier 400 appears as a short circuit to the seismic detectors in the array. Hence, damping resistor 809(i) and the sum of weighting resistor 806(i) and 807(i) are effectively in parallel at each seismic detector connection point 805(i). Since it is desirable to maintain a substantially constent damping factor between seismic detectors in the array, the values of damping resistor 809(i) and the sum of weighting resistors 806(i) and 807(i) should be chosen such that their parallel combination is substantially identical at each seismic detector connection point 705(i).

What is claimed is:

1. A seismic array which comprises:
    a plurality of seismic detector connection points;
    a seismic detector at each seismic detector connection point;
    a weighting resistor at each seismic detector connection point, said weighting resistor having one end thereof connected to one output of the seismic detector;
    a damping resistor at each seismic detector connection point, said damping resistor being connected across the outputs of the seismic detector, the parallel combination of the weighting resistor and the damping resistor at each seismic detector connection point being substantially the same for all seismic detector connection points in the array;
    a pair of wires which interconnects the seismic detector connection points in the array and which emerges from one end of the array, the first wire of said pair being connected to the second terminal of the weighting resistor at each seismic detector connection point and the second wire of said pair being connected to the other output of each seismic detector at each seismic detector connection point;
    an amplifier which is connected to the pair of wires emerging from the array; and
    a feedback network, including a feedback resistor which is associated with the amplifier, the ratios of the value of the feedback resistor to the value of the weighting resistors at the seismic detector connection points defining the elements of a ratio set, each said element determining the magnitude of signal appearing at the output of the amplifier from the response of the seismic detector at a given seismic detector connection point.

2. The seismic array of claim 1, wherein the defined ratio set contains elements which are substantially equal.

3. The seismic array of claim 1, wherein the defined ratio set contains elements which are Chebychev weighting coefficents.

4. The seismic array of claim 1, wherein the number of seismic detector connection points in the array is equal to ten.

5. The seismic array of claim 4, wherein the defined ratio set contains elements substantially as specified in Table I of the specification.

6. A seismic array which comprises:
   a plurality of seismic detector connection points;
   a seismic detector at each seismic detector connection point;
   a first weighting resistor at each seismic detector connection point, said first weighting resistor having one end thereof connected to one output of the seismic detector;
   a second weighting resistor at each seismic detector connection point, said second weighting resistor having one end thereof connected to the other output of the seismic detector;
   a damping resistor at each seismic detector connection point, said damping resistor connected across the outputs of the seismic detector, the parallel combination of the damping resistor and the sum of the first and second weighting resistors being substantially the same at all seismic connection points in the array;
   a pair of wires which interconnects the seismic dectector connection points in the array and which emerges from one end of the array, the first wire of said pair being connected to the second end of the first weighting resistor at each seismic detector connection point and the second wire of said pair being connected to the second end of said second weighting resistor at each seismic detector connection point;
   an amplifier which is connected to the pair of wires that emerges from the array; and
   a feedback network, including a feedback resistor, which is associated with the amplifier, the ratios of the value of the feedback resistor to the sum of the values of the first and second weighting resistors at the seismic detector connection points defining the elements of a ratio set, the value of each said element determining the magnitude of the signal appearing at the output of the amplifier from the response of the seismic detector at a given seismic detector connection point.

7. The seismic array of claim 6, wherein the defined ratio set contains elements which are substantially equal.

8. The seismic array of claim 6, wherein the defined ratio set contains elements which are Chevychev weighting coefficents.

9. The seismic array of claim 6, wherein the number of seismic detector connection points in the array is equal to ten.

10. The seismic array of claim 9, wherein the defined ratio set contains elements which substantially as specified in Table I of the specification.

11. A seismic array which comprises:
    a plurality of seismic detector connection points;
    a seismic detector at each seismic detector connection point;
    a signal-weighting component at each seismic detector connection point, said signal-weighting component having one end thereof connected to one output of the seismic detector;
    a damping component at each seismic detector connection point, said damping component being connected across the outputs of the seismic detector, the values of the signal-weighting component and the damping component being selected such their parallel combination is substantially the same for all seismic detector connection points in the array;
    a pair of wires which interconnects the seismic detector connection points in the array and which emerges from one end of of the array, the first wire of said pair being connected to the second terminal of the signal-weighting component at each seismic detector connection point and the second wire of said pair being connected to the other output of each seismic detector at each seismic detector connection point;
    an amplifier which is connected to the pair of wires emerging from the array; and
    a feedback network, including a feedback signal-weighting component, which is associated with the amplifier, the ratios of the value of the feedback signal-weighting component to the values of the signal-weighting components at the seismic detector connection points defining the elements of a ratio set, each said element determining the magnitude of signal appearing at the output of the amplifier from the response of the seismic detector at a given seismic detector connection point.

12. The seismic array of claim 11, wherein the defined ratio set contains elements which are substantially equal.

13. The seismic array of claim 11, wherein the defined ratio set contains elements which are Chebychev weighting coefficients.

14. The seismic array of claim 11, wherein the number of seismic detector connection points in the array is equal to ten 15. The seismic array of claim 14, wherein the defined ratio set contains elements substantially as specified in Table I of the specification.

16. A seismic array which comprises:
    a plurality of seismic detector connection points;
    a seismic detector at each seismic detector connection point;
    a first signal-weighting component at each seismic detector connection point, said first signal-weighting component having one end thereof connected to one output of the seismic detector;
    a second signal-weighting component at each seismic detector connection point, the second signal-weighting component having one end thereof connected to the other output of the seismic detector;
    a damping component at each seismic detector connection point, said damping component connected across the outputs of the seismic detector, the values of the first and second signal-weighting components and the damping components being selected such that the parallel combination of the damping component and the sum of the first and second signal-weighting components is substantially the same at all seismic detector connection points in the array;

a pair of wires which interconnects the seismic detector connection points in the array and which emerges from one end of the array, the first wire of said pair being connected to the second end of the first signal-weighting component at each seismic detector connection point and the second wire of said pair being connected to the second end of said second signal-weighting component at each seismic detector connection point;

an amplifier which is connected to the pair of wires that emerges from the array; and a feedback network, including a feedback signal-weighting component, which is associated with the amplifier, the ratios of the value of the feedback signal-weighting component to the sum of the values of the first and second signal-weighting components at the seismic detector connection points defining the elements of a ratio set, the value of each said element determining the magnitude of the signal appearing at the output of the amplifier from the response of the seismic detector at a given seismic detector connection point.

17. The seismic array of claim 16, wherein the defined ration set contains elements which are substantially equal.

18. The seismic array of claim 16, wherein the defined ration set contains elements which are Chebychev weighting coefficients.

19. The seismic array of claim 16, wherein the number of seismic detector connection points in the array is equal to ten.

20. The seismic array of claim 19, wherein the defined ration set contains elements which substantially as specified in Table I of the specification.

* * * * *